(12) United States Patent
Dimitrov et al.

(10) Patent No.: US 8,534,401 B2
(45) Date of Patent: Sep. 17, 2013

(54) HYBRID DRIVE DEVICE FOR MOTOR VEHICLES

(75) Inventors: Emil Dimitrov, Plovdiv (BG); Nikolai Ganev, Plovdiv (BG)

(73) Assignee: Emil Manolov Dimitrov, Plovdiv (BG)

( * ) Notice: Subject to any disclaimer, the term of this patent is extended or adjusted under 35 U.S.C. 154(b) by 66 days.

(21) Appl. No.: 13/060,048

(22) PCT Filed: Aug. 20, 2009

(86) PCT No.: PCT/BG2009/000013
§ 371 (c)(1),
(2), (4) Date: Feb. 21, 2011

(87) PCT Pub. No.: WO2010/020020
PCT Pub. Date: Feb. 25, 2010

(65) Prior Publication Data
US 2011/0147105 A1    Jun. 23, 2011

(30) Foreign Application Priority Data

Aug. 21, 2008    (BG) ............................................ 1487

(51) Int. Cl.
*B60K 1/00* (2006.01)
(52) U.S. Cl.
USPC .......................... 180/65.31; 180/302; 60/805
(58) Field of Classification Search
USPC ............. 180/65.31, 301–303, 65.22; 60/801, 60/805
See application file for complete search history.

(56) References Cited

U.S. PATENT DOCUMENTS

| | | | |
|---|---|---|---|
| 3,704,760 A | | 12/1972 | Maruyama |
| 3,771,916 A | * | 11/1973 | Flanigan et al. .............. 417/319 |
| 4,290,268 A | * | 9/1981 | Lowther .......................... 60/668 |
| 4,809,803 A | | 3/1989 | Ahern et al. |

(Continued)

FOREIGN PATENT DOCUMENTS

| | | |
|---|---|---|
| DE | 1755126 A | 12/1971 |
| EP | 0414535 A1 | 2/1991 |

(Continued)

OTHER PUBLICATIONS

Extended European Search Report for corresponding European Patent Publication No. 2326523.

*Primary Examiner* — Jeffrey J Restifo
*Assistant Examiner* — Erez Gurari
(74) *Attorney, Agent, or Firm* — Steven M. War, Esq.

(57) ABSTRACT

The utility model relates to hybrid drive for vehicles that significantly decreases the consumption of fuel because it uses a turbine motor (7), which is turned on solely when the charge of the accumulator batteries (3) drops and always works at best rpm. The device increases the distance covered by the vehicle without need for frequent recharge of the batteries from the power supply network. Furthermore, the turbine motor is lighter than the petrol piston engine and in the same time more efficient. The device includes installed accumulator batteries (3) that supply power to at least one electric motor coupled via transmission to the drive wheels of the vehicle, and fuel tank (4) supplying fuel to turbine motor (7) coupled via reducer (11) to generator (6) that is connected to the accumulator batteries. Control unit (9) monitors the charge of the accumulator batteries (3) and turns on and off the turbine motor (7). All six embodiments comprise a device (10) to recharge the accumulator batteries from the power supply network when the driver of the vehicle has access to it.

5 Claims, 7 Drawing Sheets

(56) References Cited

U.S. PATENT DOCUMENTS

| | | | |
|---|---|---|---|
| 5,417,051 A * | 5/1995 | Ankersmit et al. | 60/783 |
| 5,765,656 A * | 6/1998 | Weaver | 180/65.22 |
| 6,054,838 A | 4/2000 | Tsatsis | |
| 6,105,697 A | 8/2000 | Weaver | |
| 6,880,654 B2 * | 4/2005 | Plishner | 180/65.6 |
| 7,306,871 B2 * | 12/2007 | Grieve et al. | 429/415 |
| 7,743,861 B2 * | 6/2010 | Grieve | 180/65.31 |
| 2002/0157881 A1 * | 10/2002 | Bakholdin et al. | 180/65.2 |
| 2003/0209374 A1 * | 11/2003 | Gallo, Jr. | 180/65.2 |
| 2004/0124023 A1 * | 7/2004 | Plishner | 180/170 |
| 2004/0150366 A1 * | 8/2004 | Ferrall et al. | 320/101 |
| 2005/0196659 A1 * | 9/2005 | Grieve et al. | 429/34 |
| 2006/0124368 A1 * | 6/2006 | Plishner | 180/65.6 |
| 2006/0132085 A1 | 6/2006 | Loubeyre | |
| 2006/0204799 A1 * | 9/2006 | Ishikawa et al. | 429/19 |
| 2007/0114078 A1 | 5/2007 | Ososanya et al. | |
| 2009/0107743 A1 * | 4/2009 | Alston et al. | 180/65.21 |
| 2011/0147105 A1 * | 6/2011 | Dimitrov et al. | 180/65.22 |

FOREIGN PATENT DOCUMENTS

| | | |
|---|---|---|
| ES | 2154180 A1 | 3/2001 |
| JP | 2003130290 A | 5/2003 |
| JP | 2006 147246 A | 6/2006 |
| RU | 2294587 C1 | 2/2007 |

\* cited by examiner ced via a reducer to a power generator which generates # HYBRID DRIVE DEVICE FOR MOTOR VEHICLES This application claims priority to International Patent Application No. PCT/BG2009/000013(published as WO/2010/020020) with an international filing date of Aug. 20, 2009, which claims priority to BG 1487 filed on Aug. 21, 2008, the contents of which are incorporated herein in their entirety by reference.

TECHNICAL FIELD

The utility model relates to a hybrid drive device for motor vehicles and finds application in the automobile industry.

PRIOR ART

Automobiles known as Series Hybrid are vehicles driven by an electric motor wherein another motor, e.g. combustion engine, is used solely to recharge the accumulator batteries.

Known is an electric automobile driven by electric motor in which the batteries are used to store electric energy from the power supply network or another external source. The electric motor uses this stored energy to drive the automobile until the energy is exhausted.

Known from publication US2007114078 is a vehicle including a petrol engine that drives a generator, which generates electric current and charges the batteries which on their side power the electric motor that drives the automobile.

This embodiment with a petrol engine can only use liquid fuel, e.g. petrol, to produce electric energy which results in the automobile engine being heavier but with lower power and lower efficiency.

The petrol piston engine works in synchronously with the electric motor, which increases the fuel consumption and decreases the distance that the vehicle can cover.

Technical Innovation of the Utility Model

The goal of this utility model is to create a hybrid drive for vehicles that increases the distance covered by the vehicle without the need for frequent recharge of the batteries from the power supply network and in the same decreases the fuel consumption in view of lowering the noxious emissions.

The goal is achieved by a hybrid drive for vehicles including batteries mounted on the chassis of the vehicle, which supply power to at least one electric motor. The electric motor is coupled by the means of a transmission to the drive wheels of the vehicle.

According to the utility model, the chassis supports a fuel tank to supply fuel to a turbine engine. Via a reducer, the turbine engine is coupled to a generator that produces electric energy and is connected to the batteries to recharge them.

On the chassis shall be installed a control unit that controls the level of charge of the accumulator batteries and commands the switching on or off of the turbine engine.

In one embodiment of the utility model, the fuel tank contains liquid fuel.

Another embodiment is possible wherein the tank contains compressed combustible gas.

In yet another embodiment of the utility model, when the tank contains compressed combustible gas, it is possible to install between the tank and the turbine engine a pneumatic turbine connected to the power generator.

There is an embodiment in which the pneumatic turbine is coupled to an additional power generator.

In the case when the tank contains compressed non combustible gas, the hybrid drive of the vehicle includes accumulator batteries installed on the chassis of the vehicle, which supply power to at least one electric motor. Via a transmission, the electric motor is coupled to the drive wheels of the vehicle. Through a duct from the tank, compressed non combustible gas is supplied to a pneumatic turbine, which is coupled via a reducer to a power generator which generates electric energy and recharges the accumulator batteries.

The chassis shall support a control unit that controls the level of charge of the accumulator batteries.

It is possible to couple one electric motor to each of the two front drive wheels.

Another embodiment of the utility model provides for one electric motor coupled to each one of the four wheels of the vehicle.

All embodiments of the utility model provide for a device to recharge the accumulator batteries from the power supply network.

The advantage of the utility model consists in that it significantly decreases the fuel consumption because a turbine motor is used that is only activated when the charge of the accumulator batteries is low, and it always works at best regime. Thus, the distance covered by the vehicle is increased without need to frequently recharge the batteries from the power supply network because they are recharged by the action of the turbine motor. Furthermore, the turbine motor is lighter than the petrol piston engine and in the same time more efficient.

DESCRIPTION OF THE DRAWINGS

The utility model is explained through the embodiment shown on the enclosed drawing figures, wherein.

On FIG. 1 is shown a line diagram of the hybrid drive of a vehicle with electric motors coupled to the two drive wheels and using liquid fuel.

POSSIBLE CONSTRUCTION OF THE INVENTION OF THE UTILITY MODEL

Figure 1:
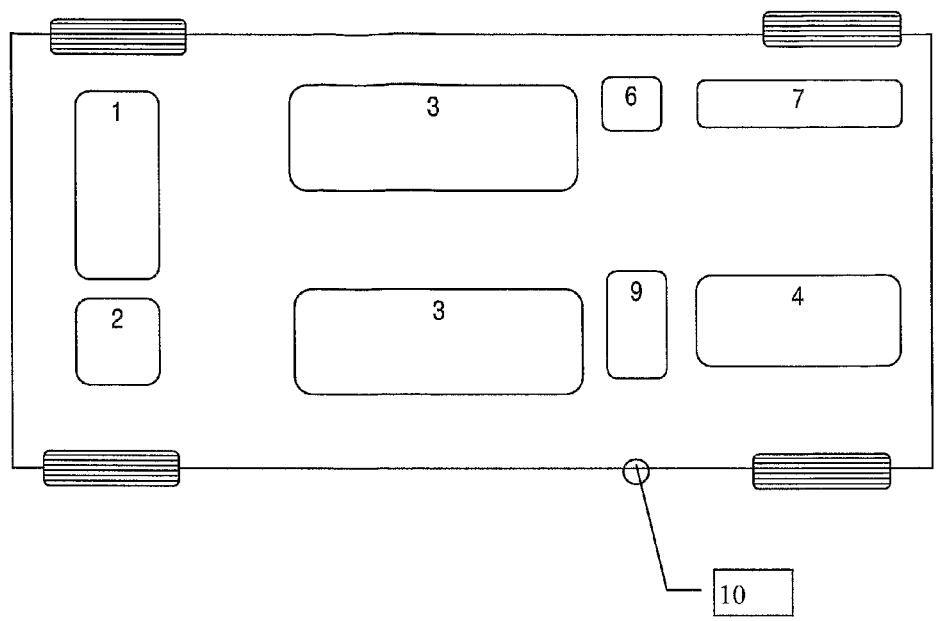

As shown on FIG. 1, the hybrid drive of a vehicle comprises accumulator batteries (3) installed on the chassis that supply power to an electric motor (1), which is connected via the transmission (2) to the two drive wheels of the vehicle. A liquid fuel tank (4) that supplies power to the turbine motor (7) is installed on the chassis. The torque of the turbine motor (7) is transmitted through reducer (11) to power generator (6). The reducer (11) may be incorporated into the power generator (6). Thus, the power generator (6) produces electric current to recharge the accumulator batteries (3).

The device is also fitted with control unit (9) that controls the charge of the accumulator batteries 93). When the charge of the accumulator batteries (3) drops below certain level, the control unit (9) starts the turbine motor (7).

When the accumulator batteries are completely recharged, the control unit sends a signal to turn off the turbine motor (7).

Figure 2:
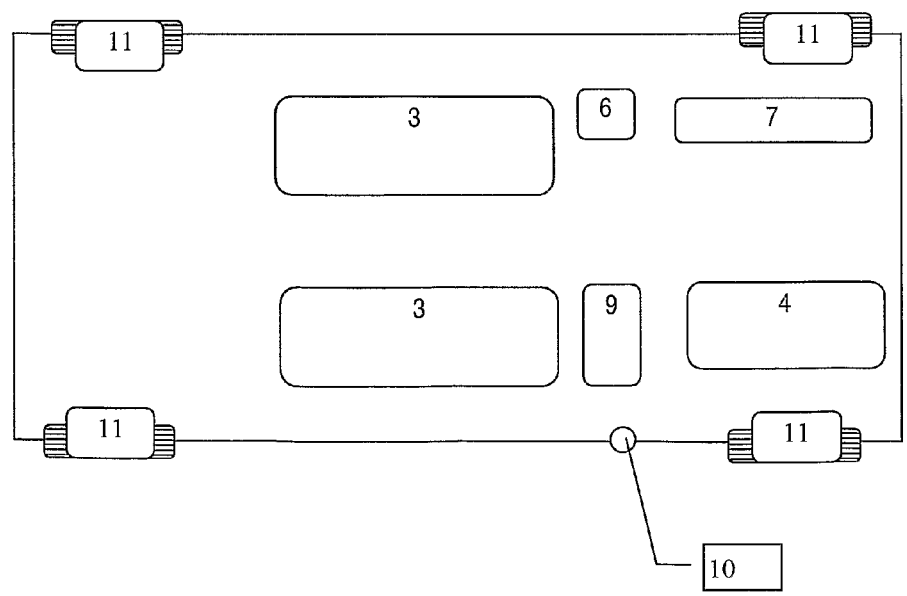
FIG. 2: Embodiment of the device with electric motors coupled to the four wheels of the vehicle and using liquid fuel.

On FIG. 2 is shown another embodiment of the device in which an electric motor (1) is coupled to each of the four wheels of the vehicle.

Figure 3:
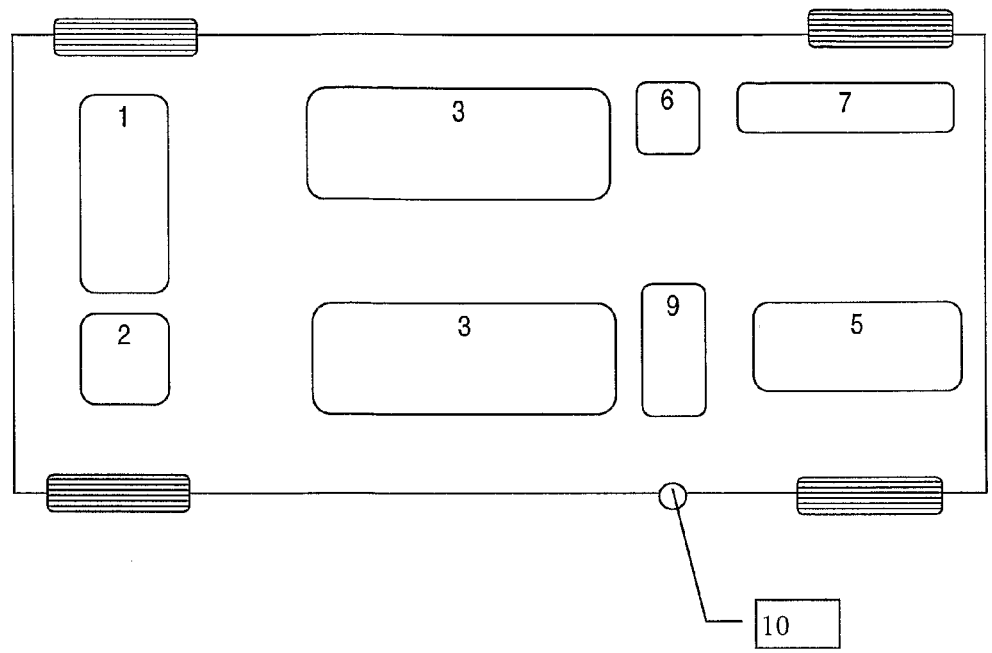
FIG. 3: Embodiment of the device using compressed combustible gas.

On FIG. 3 is shown an embodiment of the device in which the tank (4) contains compressed combustible gas instead of liquid fuel.

Figure 4:
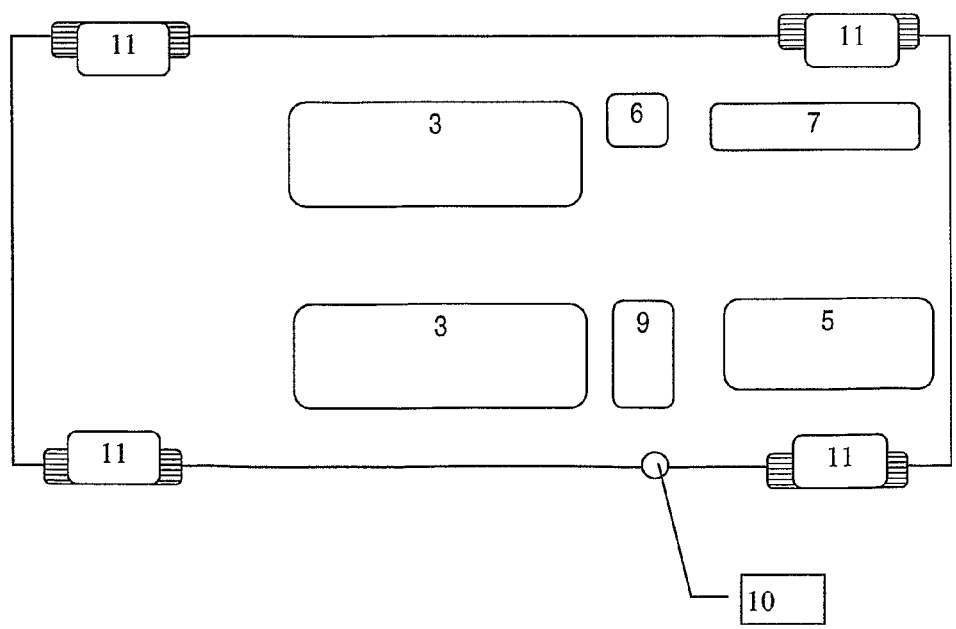
FIG. 4: Embodiment of the device in which a pneumatic turbine is installed between the compressed combustible gas tank and the turbine motor.

In the embodiment of the device disclosed on FIG. 4, the tank (4) contains compressed combustible gas and between the tank and the turbine motor is installed pneumatic turbine (8). Along a gas duct, the compressed combustible gas is fed from the tank (4) to the pneumatic turbine (8). In the latter, the compressed combustible gas expands, the pressure drops and the turbine (8) is actuated. The combustible gas, at pressure lowered in the pneumatic turbine (8), is fed into the turbine motor where it bur The torques resulting from the work of the pneumatic turbine (8) and the turbine motor (7) are transmitted through reducer (11) to the power generator (6). In this way, the power generator (6) produces electric current and recharges the accumulator batteries (3).

The device is further fitted with control unit (9) that controls the charge of the accumulator batteries (3). When the charge of the accumulator batteries (3) drops, the control unit (9) sends a signal to start the turbine motor (7).

When the accumulator batteries (3) are fully recharged, the control unit (9) sends a signal to turn off the turbine motor (7).

Figure 5:
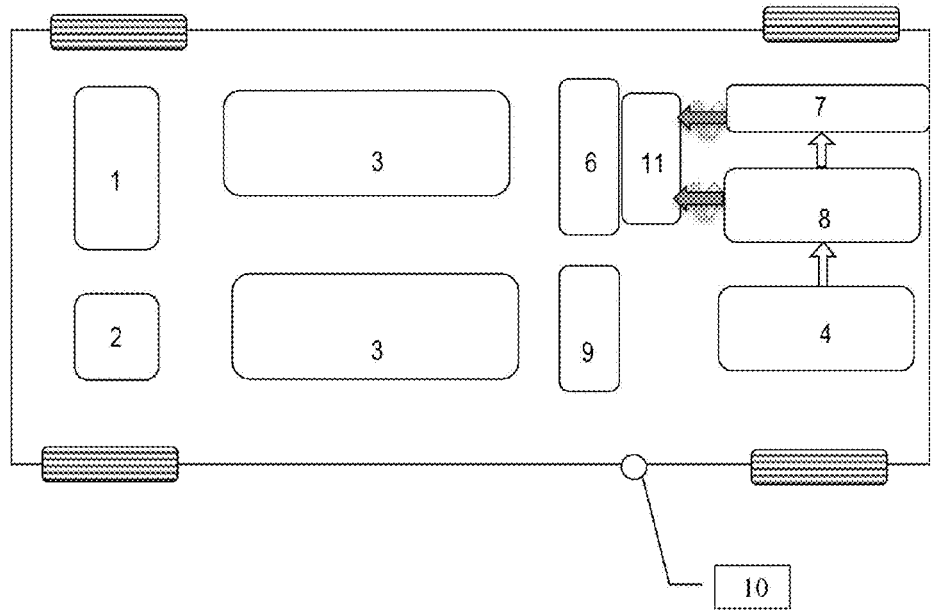
FIG. 5: Embodiment of the device shown on FIG. 4, in which the pneumatic turbine is connected to an additional power generator.

On FIG. 5 is shown a version of FIG. 4 in which the torque from the pneumatic turbine (8) is transmitted via reducer (11) to additional generator (6').

Figure 6:
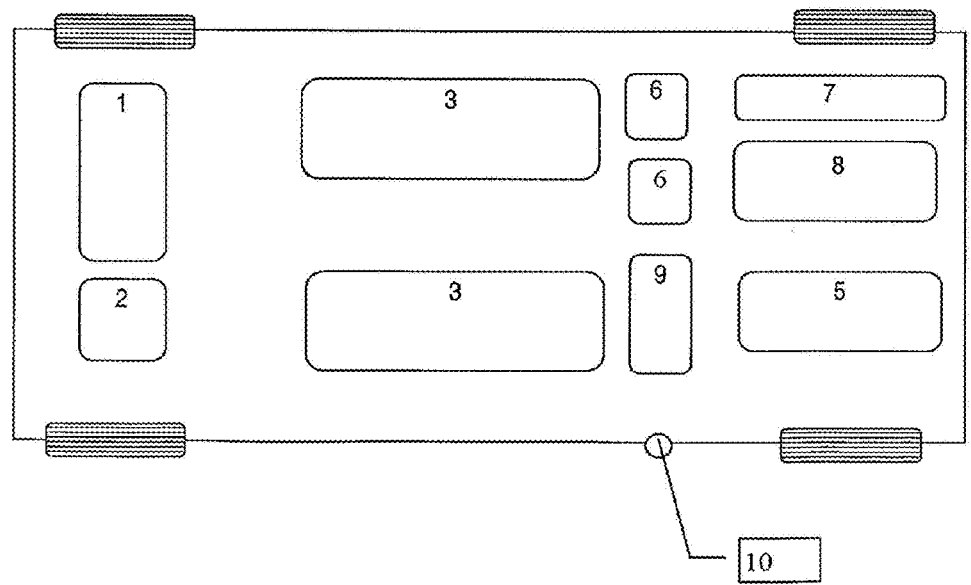
FIG. 6: Embodiment of the device without turbine motor but only with pneumatic turbine
Figure 7:
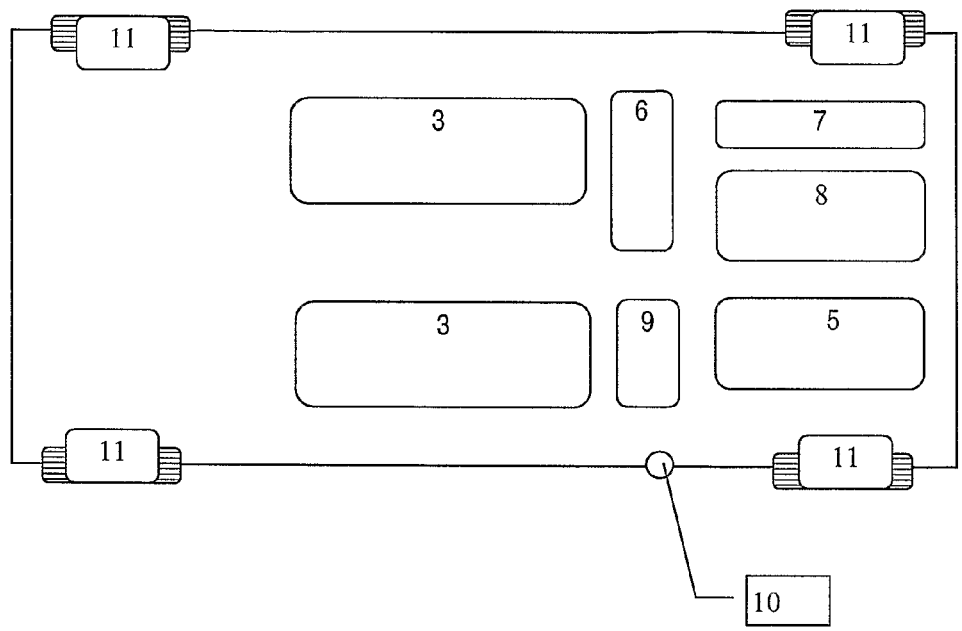
FIG. 7 shows an embodiment of the device including pneumatic turbine, turbine engine and four reducers.
Figure 8:
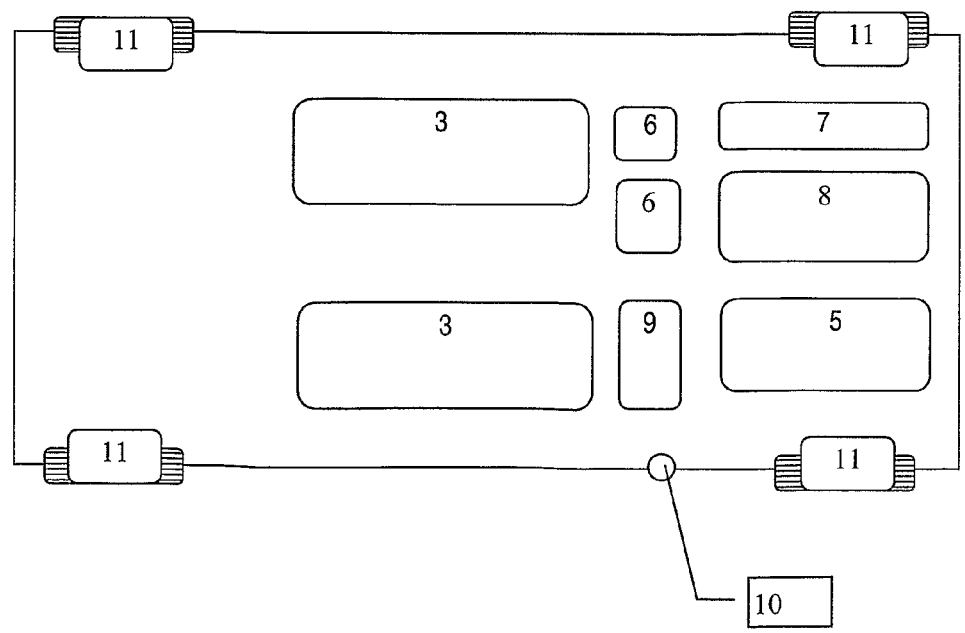
FIG. 8 shows an embodiment of the device as shown in FIG. 7 including two power generators.
Figure 9:
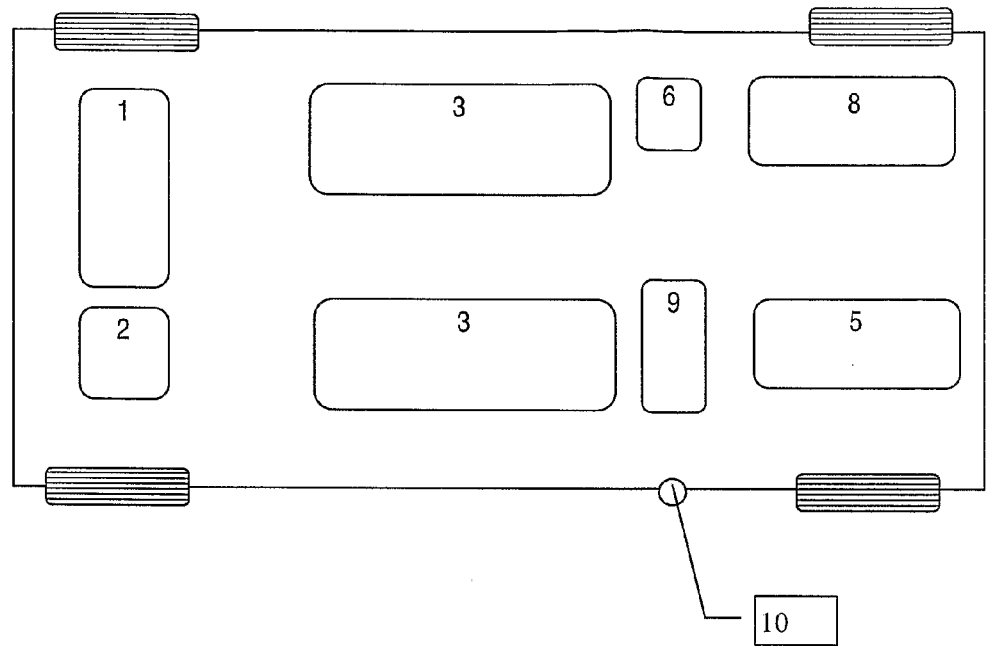
FIG. 9 shows an embodiment of the device including pneumatic turbine and single driving electric motor for the front axle.
Figure 10:
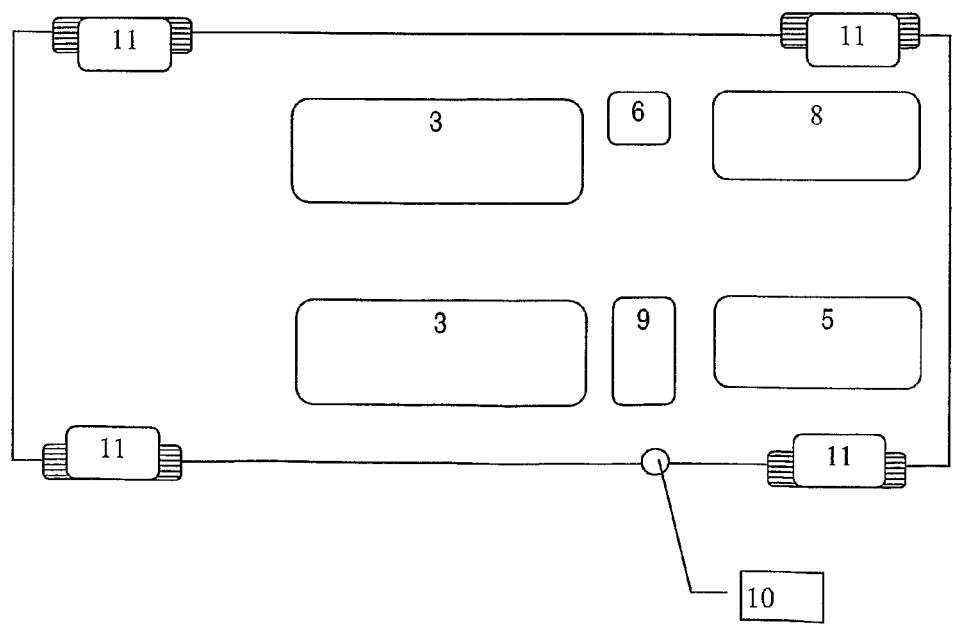
FIG. 10 shows an embodiment of the device same as FIG. 9 including built-in electric motor in each wheel.
Figure 11:
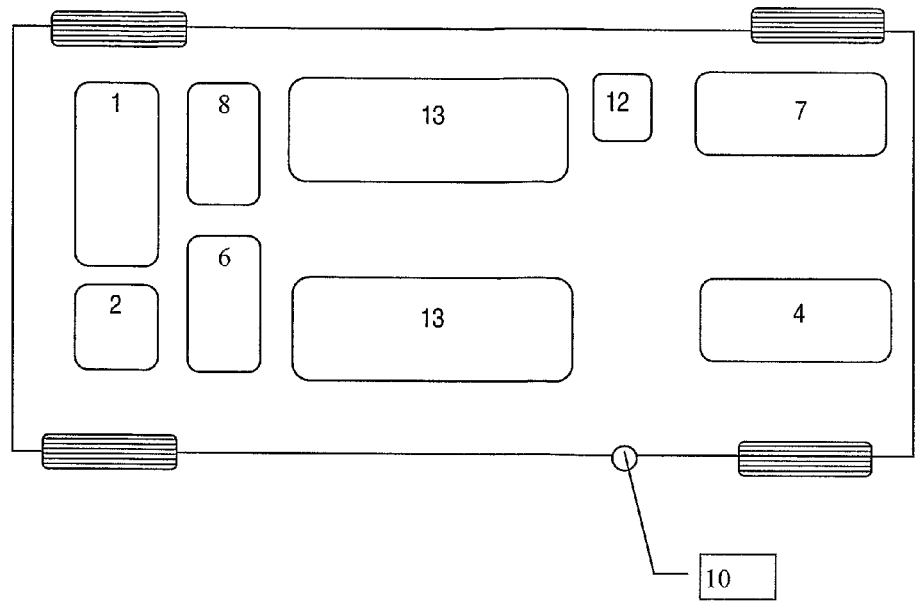
FIG. 11 shows another embodiment of the device including turbine engine connected to compressor similar to FIG. 9.
Figure 12:
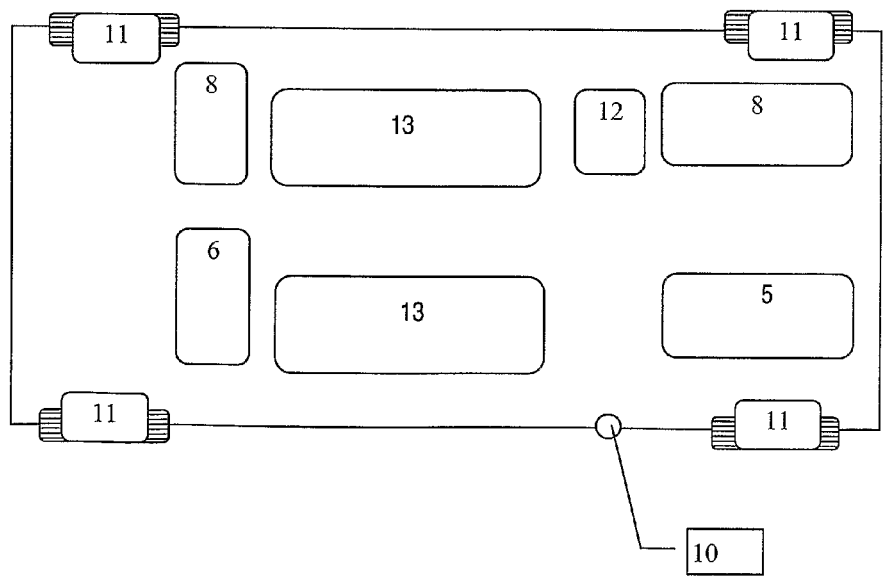
FIG. 12 shows another embodiment of the device including turbine engine connected to compressor similar to FIG. 10.
Figure 13:
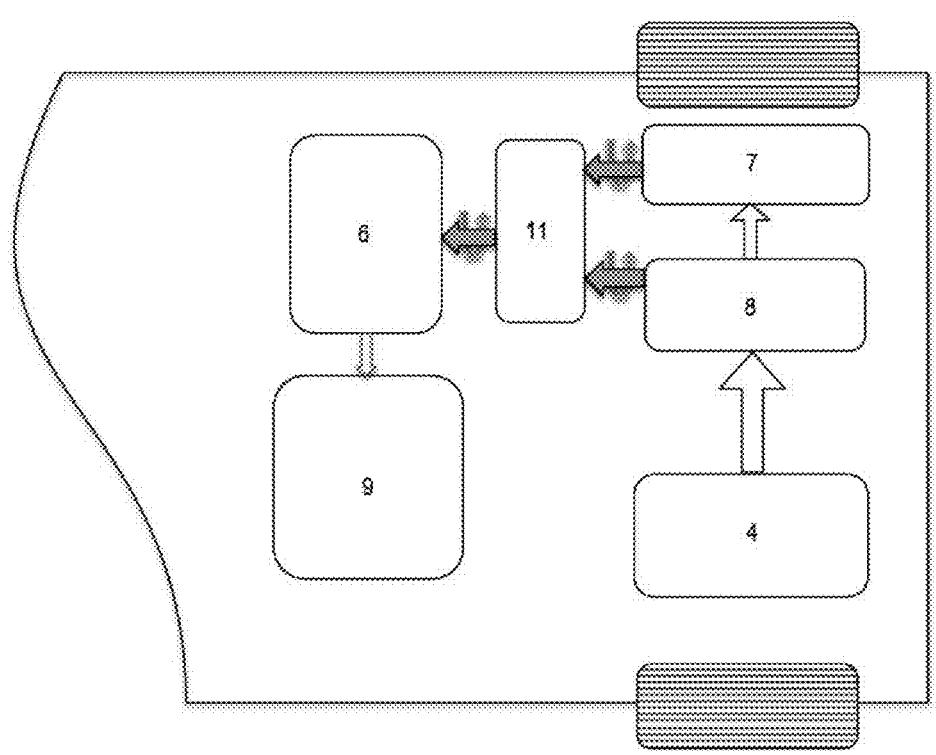
FIG. 13 shows another embodiment of the device including power generator, control unit, reducer, turbine motor, pneumatic turbine, and fuel tank.

On FIG. 6 is shown an embodiment in which the hybrid drive for vehicles comprises accumulator batteries (3) installed on the chassis, which supply power to electric motor (1) that is coupled via transmission (2) to the two drive wheels of the vehicle. To the chassis is fixed tank (5) containing compressed non combustible gas. Through gas duct, the compressed non combustible gas from the tank (5) is fed into the pneumatic turbine (8). The resulting torque of the pneumatic turbine (8) is transmitted via reducer (11) to power generator (6). The reducer (11) may be incorporated in the power generator. Thus, the power generator (6) produces electric current to recharge the accumulator batteries (3).

The device is further fitted with control unit (9) that controls the charge of the accumulator batteries (3).

In all embodiments of the device an arrangement (10) is fitted for recharge of the accumulator batteries from the power supply network when the driver has access to it.

The invention claimed is:

1. Hybrid drive for vehicles comprising accumulator batteries that supply power to at least one electric motor connected via transmission to the drive wheels of the vehicle, wherein on the chassis of the vehicle is installed a fuel tank that supplies compressed combustible gas through a gas duct to a pneumatic turbine where the compressed combustible gas expands, wherein the combustible gas is fed from said pneumatic turbine to a turbine motor thereby actuating said turbine motor wherein the turbine motor is connected through a reducer to a generator, which is connected to the accumulator batteries; and a control unit that monitors the charge of the accumulator batteries and turns on or off the turbine motor.

2. Hybrid drive for vehicles as claimed in claim 1, wherein the tank is for compressed combustible gas.

3. Hybrid drive for vehicles of claim 1, wherein said pneumatic turbine is connected via reducer to the generator.

4. Hybrid drive for vehicles of claim 1, wherein the reducer is incorporated into the generator.

5. Hybrid drive for vehicles of claim 1, further including a device permitting a driver of said vehicle to charge the accumulator batteries from the power supply network.

\* \* \* \* \*